UNITED STATES PATENT OFFICE.

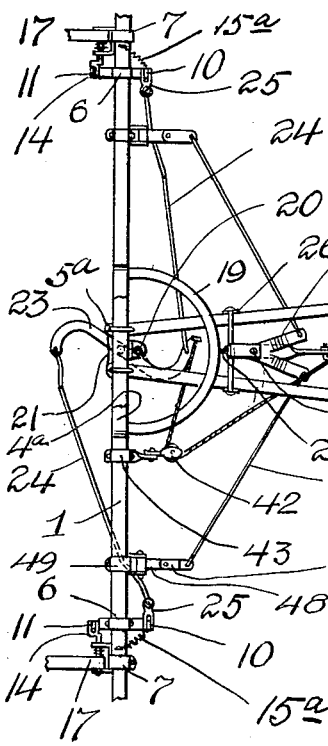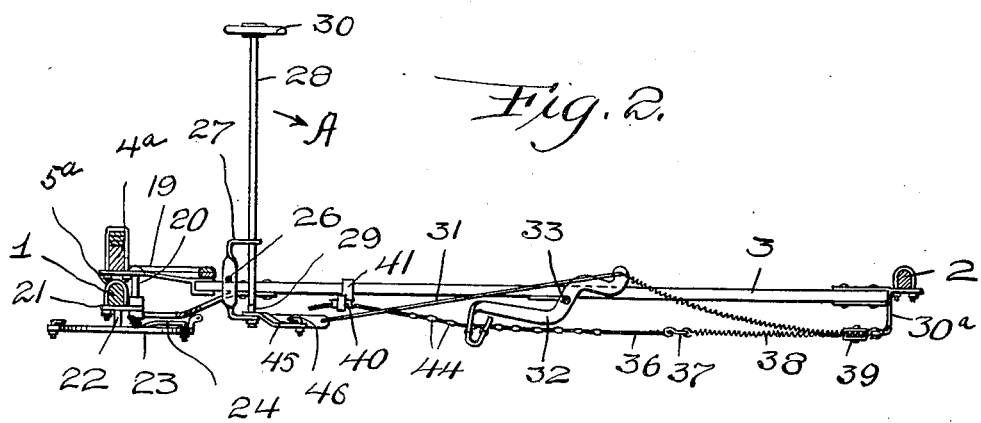

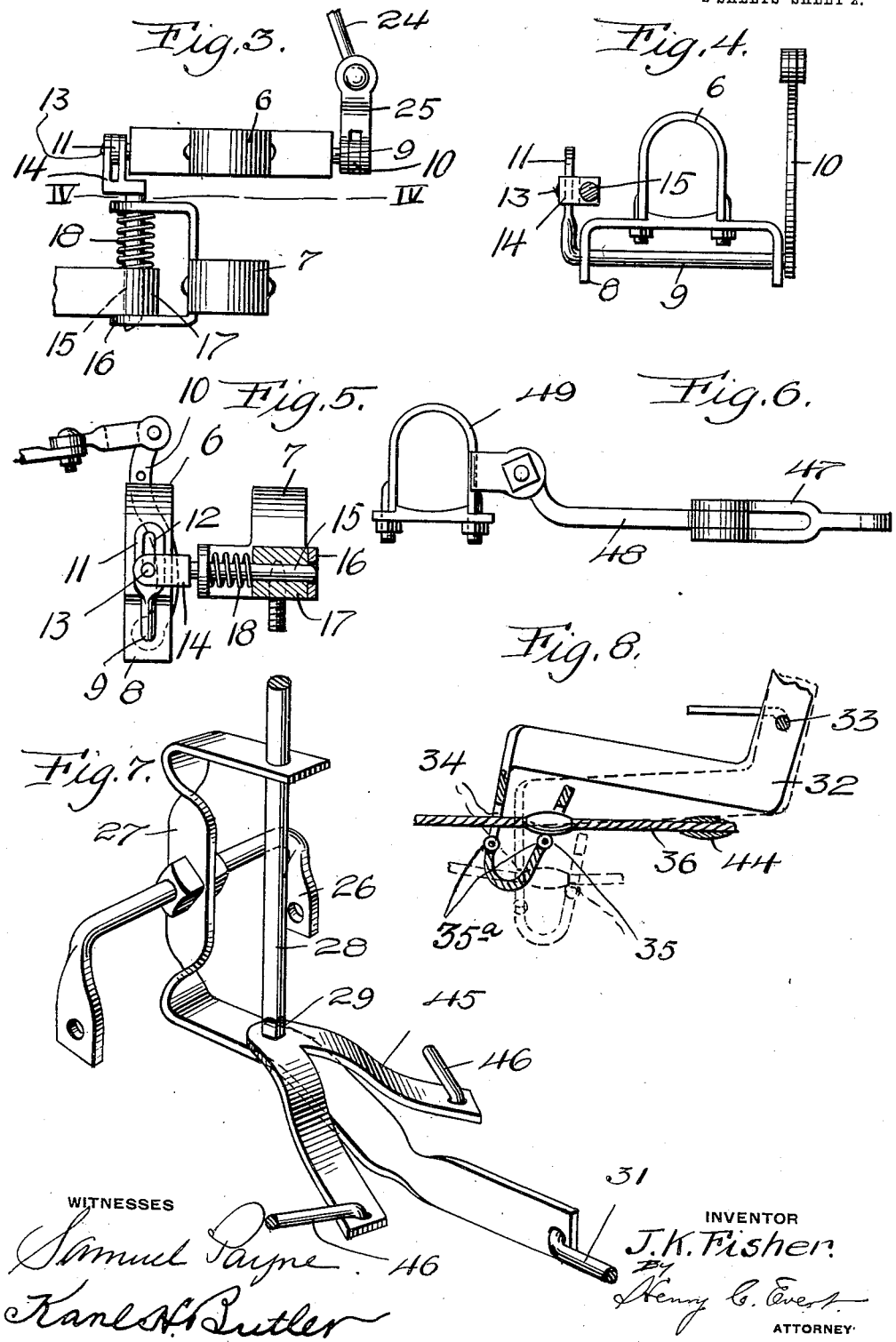

JEROME K. FISHER, OF DERRY, PENNSYLVANIA.

SHAFT AND TONGUE DETACHER.

1,096,231.   Specification of Letters Patent.   Patented May 12, 1914.

Application filed July 17, 1913. Serial No. 779,542.

*To all whom it may concern:*

Be it known that I, JEROME K. FISHER, a citizen of the United States of America, residing at Derry, in the county of Westmoreland and State of Pennsylvania, have invented certain new and useful Improvements in Shaft and Tongue Detachers, of which the following is a specification, reference being had therein to the accompanying drawing.

This invention relates to a shaft and tongue detacher for vehicles, and the primary object of my invention is to provide a novel device that can be readily attached to a vehicle and used to prevent excitable, fractious and run-away horses from injuring a vehicle or the occupants thereof.

Another object of this invention is to provide a shaft detaching device that has novel means for immediately placing the device in operation, the same means serving as a steering or guiding mechanism whereby after the shafts have been detached the vehicle can be guided until it stops.

A further object of this invention is to provide a spring actuated shaft or tongue detacher that can be easily and quickly placed in operation to permit of run-away horses departing with a tongue or shafts without any danger of the vehicle or occupants thereof being injured.

A still further object of this invention is to provide a shaft detaching device that is durable, easy to install, applicable to various vehicles, and highly efficient for the purposes for which it is intended.

With the above and other objects in view the invention resides in the novel construction, combination and arrangement of parts to be hereinafter more specifically described and then claimed.

Reference will now be had to the drawings, wherein:—

Figure 1 is a plan of the shaft detacher showing the operating post broken away, Fig. 2 is a side elevation of the same partly broken away and partly in section, Fig. 3 is a plan of the shaft holder, Fig. 4 is a cross sectional view of the same taken on the line IV—IV of Fig. 3, Fig. 5 is a front elevation of the same partly broken away and partly in section, Fig. 6 is a side elevation of an axle clevis, Fig. 7 is a perspective view of the bearing for the operating post, and Fig. 8 is a side elevation of a locking member partly broken away and partly in section.

In describing my invention by aid of the drawings above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings, the reference numerals 1 and 2 denote the forward and rear axles of a vehicle and these axles are connected by perches 3 and 4 that are connected to the rear axle by clevises 5 and to a bolster 4ª by clevises 5ª.

Adjacent to the ends of the axle 1 are shaft holders, comprising clevises 6 and 7. The former has depending bearings 8 for a rock shaft 9 and the ends of said shaft are provided with cranks 10 and 11. The cranks 11 are slotted, as at 12 to receive pins 13, carried by the bifurcated heads 14 of the shaft pins 15. The shaft pins 15 are slidably mounted in a yoke 16 carried by the clevis 7 and said pins are adapted to extend through the rear ends of the shafts 17, which are prevented from rattling or shifting upon said pins by coiled compression springs 18 encircling said pins within the yokes. Springs 15ª can be connected to the cranks 10 and the axle to normally hold the shaft pins 15 in a closed position, that is in engagement with the ends of the shafts 17.

The bolster 4ª has a conventional form of fifth wheel 19 and a king bolt connection 20 with the axle 1. The king bolt connection 20 is in the form of a clevis 21 provided with a depending pin 22 for a horizontal compound curved cross head 23, which has the ends thereof pivotally connected to rods 24. The rods have offset portions and are pivotally connected by links 25 to the cranks 10 of the rock shafts 9.

The perches 3 and 4 are connected by a transverse bearing 26 and fulcrumed upon said bearing is a yoke 27 having the ends thereof arranged in parallelism to revolubly support the lower end of an operating post 28. The post 28 has a rectangular portion 29 and at the upper end of said post there is a steering wheel 30. The lower end of the yoke 27 is prolonged and is connected by a rod 31 to the upper end of a pivoted compound curved locking member 32, said member being pivoted upon a transverse rod 33 connecting the perches 3 and 4. The lower end of the member 32 is hook-shaped, as best shown in Fig. 8 and provided with alining openings 34 and 35. The lower walls of the openings 34 and 35 have antifrictional rollers 35$^a$ to reduce the friction upon the cable 36 that extends through said openings. The cable 36 has the rear end thereof connected, as at 37 to the end of a coiled spring 38. The spring 38 is trained over a horizontal sheave 39, carried by a bracket 30$^a$ secured to the rear axle 2. The end of the spring is attached to the upper end of the member 32. The opposite end of the cable 36 is trained around a sheave 40, pivotally connected to a clamp 41 secured to the perch 3. The end of the cable is trained around another sheave 42 pivotally connected to a clamp 43 carried by the forward axle 1, said cable being connected to the rear end of the cross head 23. The cable 36 has equally spaced bodies or buttons 44 that can freely pass through the openings 34 of the member 32 when the member is in its normal position, but when the hook-shaped end of the member 32 is lowered, the openings 34 and 35 are thrown out of alinement, as shown by dotted lines in Fig. 8, and one of the bodies or buttons 44 is held in the hook-shaped end of the member, by reason of the upper edge of the opening 34 engaging the upper edge of the body and the lower edge of the opening 35 engaging the lower edge of the body. The cable 36 is therefore held relatively to the member 32 and is moved thereby.

Mounted upon the rectangular portion 29 of the operating post 28 is a rearwardly extending fork 45 and pivotally connected to said fork are reach rods 46. The rods 46 are connected by links 47 to pivoted arms 48 carried by clevises 49 clamped upon the forward axle 1, adjacent to the clevises 6.

To place the device in operation, it is only necessary for an occupant of a vehicle to move the operating post 28 in the direction of the arrow A, Fig. 2, thereby rocking the yoke 27. When the yoke 27 is moved the pivoted member 32 is rocked whereby the cable 36 is locked in engagement therewith, consequently the cable 36 is moved and pulls upon the cross head 23, which in turn pulls upon the rods 24, rocks the shafts 9 and withdraws the pins 15 from the rear ends of the shafts. When the shafts are released the run-away animals can depart and the vehicle can be steered or guided by rotating the post 28, which through the medium of the fork 45, rods 46, links 47, arms 48 and clevises 49, the forward axle 1 can be shifted to retain the vehicle in the middle of a road or street until it is stopped.

The spring 38 retains the cable 36 in position and permits of said cable shifting as is necessary in order to move the pins 15 to attach the shafts to the forward axle.

What I claim is:—

In a shaft detacher, the combination with vehicle axles, perches connecting said axles, and shafts adapted to be connected to one of said axles, of clevises connected to said axle, a yoke carried by some of said clevises, pins movable in said yokes and adapted to hold said shafts, a horizontal cross head movably supported beneath said axle and connected indirectly to said pins, a yoke pivotally supported between said perches, an operating post rotatably supported by said yoke, a locking member pivotally supported between said perches and connected to said yoke, a cable extending through the lower end of said locking member and connected to said cross head and adapted to be locked in engagement with said member when said member is moved through the medium of said yoke and said operating post, a spring connecting the end of said cable and the upper end of said member, a form carried by the lower end of said operating post, reach rods connected to said fork and clevises mounted upon the forward axle and connected to said reach rods whereby said post can be used for steering the forward axle.

In testimony whereof I affix my signature in the presence of two witnesses.

JEROME K. FISHER.

Witnesses:
 JOHN P. TONER,
 ROY L. STERNER.

---

Copies of this patent may be obtained for five cents each, by addressing the "Commissioner of Patents, Washington, D. C."